United States Patent [19]
Clapp et al.

[11] Patent Number: 5,793,904
[45] Date of Patent: Aug. 11, 1998

[54] ZONED INSPECTION SYSTEM AND METHOD FOR PRESENTING TEMPORAL MULTI-DETECTOR OUTPUT IN A SPATIAL DOMAIN

[75] Inventors: Todd E. Clapp, St. Paul; Kenneth L. Wolfe, Jr., Maplewood; Mark R. Drutowski, St. Paul, all of Minn.

[73] Assignee: Minnesota Mining and Manufacturing Company, St. Paul, Minn.

[21] Appl. No.: 567,841

[22] Filed: Dec. 6, 1995

[51] Int. Cl.$^6$ .................................................. G06K 9/00
[52] U.S. Cl. ............................................ 382/318; 382/112
[58] Field of Search ............................... 382/318, 141, 382/151, 112, 322, 321; 358/474, 471, 486, 494, 488, 496; 250/559, 571

[56] References Cited

U.S. PATENT DOCUMENTS

| | | | |
|---|---|---|---|
| 3,962,681 | 6/1976 | Requa et al. | 382/318 |
| 4,465,939 | 8/1984 | Tamura | 382/318 |
| 4,833,724 | 5/1989 | Goel | 382/318 |
| 5,305,392 | 4/1994 | Longest, Jr. et al. | 382/112 |
| 5,394,186 | 2/1995 | Antoine et al. | 382/318 |

*Primary Examiner*—Joseph Mancuso
*Attorney, Agent, or Firm*—Gary L. Griswold; Walter N. Kirn; Charles D. Levine

[57] ABSTRACT

A zoned inspection system and method produce inspection results consistent with a user's view of an article by transforming parallel, temporal inspection results from multiple detectors into a serial, spatial domain.

18 Claims, 7 Drawing Sheets

ZONED INSPECTION SYSTEM AND METHOD FOR PRESENTING TEMPORAL MULTI-DETECTOR OUTPUT IN A SPATIAL DOMAIN

FIELD

The present invention relates to article inspection technology and, more particularly, to techniques for zoned article inspection using multiple detectors.

BACKGROUND

Pixel detectors are widely used in inspection systems for detection of conditions such as defects on manufactured articles such as, for example, web material. The pixel detector typically comprises a line scan camera that scans a plurality of pixels within an inspection window defined by the active scan of the camera. Alternatively, the pixel detector may comprise, for example, a scanned diode array or a scanned photomultiplier tube. To aid in locating defects, the article can be divided into cells. In the inspection of a moving web, for example, the cells may be defined by cross-web inspection zones and down-web inspection intervals. When the pixel detector detects a defect, the inspection system records the defect as being within a particular cell.

The defect data can be used for product pass/fail, process control, or quality control. For process control, the web generally is divided into several equal cross-web inspection zones. A web tachometer monitors down-web intervals. The number of cross-web inspection zones is usually kept to a relatively small number to enable a user to easily visualize the inspection zones for location of defects. Visualization of the inspection zones enables the user to quickly locate a region of the web in which a large number of defects are detected. The user can inspect the affected region and determine a course of action to eliminate the source of the defects.

When a single line scan camera is used, the camera will have a field of view slightly greater than the web width. FIG. 1 is a diagram illustrating an example of a web inspection system using a single line scan camera A. FIG. 1 shows both a spatial domain representing the spatial coverage of an active scan of line scan camera A relative to a moving web 10, and a temporal domain representing the progression of the active scan across different web zones over time. In the example of FIG. 1, camera A is located at machine center 12, indicating the center of a processing line along which web 10 is moved. The camera A has a field of view 14 that extends along a width of web 10. The active scan of camera A is set to extend only to the edges of web 10.

In the example of FIG. 1, web 10 is divided into four cross-web inspection zones I1, I2, I3, I4. The active scan of camera A is divided into a plurality of scan zones S1, S2, S3, S4. For defect signal processing, the number of pixels in the active scan of camera A can be easily divided by the number of cross-web zones I1, I2, I3, I4 to arrive at the number of pixels per scan zone S1, S2, S3, S4. Defects can be mapped to a cross-web location according to which pixel was activated by the defect. With a single line scan camera A, the temporal and spatial domains align so that the camera scan conforms to the user's visualization. With reference to the temporal domain in FIG. 1, for example, the active scan progresses across each of inspection zones I1, I2, I3, I4 in sequence such that pixels scanned at the end of the spatial domain are also scanned at the end of the temporal domain.

When two or more cameras are used, a temporal-spatial mismatch or "rift" can occur. Two or more cameras are used when a single camera does not provide adequate cross-web resolution. The cameras are configured to run in either serial or parallel. In the serial mode, only one of the cameras clocks data at a time. When one camera is clocking, the other camera is in a standby mode. When the first camera reaches the end of its active scan, the other camera takes over and begins clocking data for the other half of the web. In the serial mode, defect processing effectively functions as one camera with twice the number of pixels as with a single camera. In this case, the temporal operation of the two cameras matches their spatial orientation. Because there are twice as many pixels to handle, however, the clock frequency must be doubled or the web speed must be cut in half to maintain the same down-web resolution. Increasing the clocking frequency leads to electronic and lighting limitations. Slowing down the web limits production. Generally, neither solution is acceptable. For this reason, serial operation of line scan cameras is not often used.

A solution to the speed problems inherent in serial operation is to operate the cameras in parallel. FIG. 2 is a diagram illustrating an example of a web inspection system using two line scan cameras A, B. FIG. 2 shows both a spatial domain representing the spatial coverage of fields of view 16, 18 of line scan cameras A, B relative to web 10, and a temporal domain representing the progression of the active scans of the cameras across different web zones over time. For parallel operation, the cameras A, B are positioned with respect to machine center 12 such that each camera views slightly more than one half of the widest web to be run. In this manner, camera A scans a first region of web 10 and camera B scans a second region. In the temporal domain, web inspection starts at the same time for both cameras A, B so that the cameras scan web 10 simultaneously. In the spatial domain, however, web inspection by cameras A, B starts at different spatial positions.

With reference to FIG. 2, web inspection by camera A starts at the beginning of a first scan zone S1A and proceeds through scan zone S2A. Thus, scan zones S1A and S2A have a temporal-spatial match. Web inspection by camera B starts at the beginning of scan zone S3B and proceeds through scan zone S4B. Because web inspection by cameras A, B proceeds in parallel, a temporal-spatial mismatch occurs between scan zones S1A, S2A and scan zones S3B, S4B. Specifically, as illustrated by the temporal domain in FIG. 2, inspection of scan zones S3B and S4B does not occur after inspection of scan zones S1A and S2A as the spatial domain would suggest. Rather, inspection of scan zones S1A, S2A and scan zones S3B, S4B occurs at the same time. Indeed, inspection of scan zone S3B actually occurs prior to inspection of scan zone S2A, which would otherwise spatially and temporally precede scan zone S3B in a single-camera scan.

If the object of the inspection system is to simply count defects that occur within each web map cell, the temporal-spatial mismatch illustrated by FIG. 2 generally will not be a problem. However, FIG. 2 represents an ideal situation in which the active scans have been calibrated such that the active scan of camera A ends precisely at the start of the active scan of camera B and coincides precisely with machine center 12. This ideal situation ordinarily will not exist due to variations in web widths and, in some cases, selection of an odd number of zones.

FIG. 3 is a diagram illustrating an example of a web inspection system using two line scan cameras A, B in a less ideal situation. Like FIGS. 1 and 2, FIG. 3 shows both a spatial domain representing the spatial coverage of fields of view 16, 18 of line scan cameras A, B relative to web 10, and a temporal domain representing the progression of the active scans of the cameras across different web zones over time. A typical web line may run webs of different widths. In addition, the webs may be center-steered or edge-steered. In the example of FIG. 3, web 10 is left edge-steered and has a width less than the maximum width accommodated by the web line. Consequently, the center of web 10 does not coincide with machine center 12. For inspection, the user views inspection zones I1, I2, I3, I4 on web 10 without regard to the position of machine center 12 or fields of view 16, 18 of cameras A and B.

As shown in FIG. 3, the active scans of cameras A, B cover inspection zones I1, I2, I3, I4 with scan zones S1A, S2A, S3A, S4B, S5B. FIG. 3 indicates that scan zones S1A and S2A correspond both temporally and spatially to inspection zones I1 and I2, respectively. Inspection zone I3 should have the same width as each of inspection zones I1 and I2. In effect, however, the active scan of camera A truncates inspection zone I3, producing scan zone S3A. At the beginning of the active scan of camera B, scan zone S4B extends for a width corresponding to the width of inspection zone I3. If web 10 were even narrower than shown in FIG. 3, however, scan zone S4B could be truncated. As further shown in FIG. 3, the active scan 18 of camera B also produces a truncated scan zone S5B that extends to the edge of web 10.

As illustrated by the example of FIG. 3, the user visualizes four inspection zones I1, I2, I3, I4 with equal widths, but cameras A and B produce five scan zones S1A, S2A, S3A, S4B, and S5B of varying widths. With the many possible combinations of different web widths, different numbers of desired inspection zones, and different web steering options, the user's view of web 10 can be very different from the inspection results produced by cameras A and B. To facilitate the user's analysis of web 10 for correction of defects, it is desirable that the inspection results produced by cameras A and B correspond to the user's view.

Accordingly, there is a need for an improved system and method for carrying out zoned inspection on articles such as web materials based on multi-detector output that is capable of producing inspection results consistent with the user's view of the article.

SUMMARY OF THE INVENTION

The present invention is directed to a zoned inspection system and method. The zoned inspection system and method of the present invention can produce inspection results consistent with a user's view of an article by transforming parallel, temporal inspection results into a serial, spatial domain.

In a first embodiment, the present invention provides a system for inspecting an article, wherein the article is divided into a plurality of inspection zones, the system comprising a first pixel detector for scanning a plurality of first pixels in a first region of an article, a second pixel detector for scanning a plurality of second pixels in a second region of the article simultaneously with the scanning of the first pixels in the first region by the first pixel detector, means for generating a running pixel count indicating a number of the first pixels and the second pixels simultaneously scanned by the first pixel detector and the second pixel detector, means for generating a first pixel condition signal for each of the first pixels indicating a condition of the article, and for generating a second pixel condition signal for each of the second pixels indicating a condition of the article, means for dividing the article into a plurality of first scan zones, each of the first scan zones being within one of the inspection zones and representing a subset of the first pixels, means for dividing the article into a plurality of second scan zones, each of the second scan zones being within one of the inspection zones and representing a subset of the second pixels, means for determining, for each of the first pixels for which the first pixel condition signal is generated, one of the first scan zones in which the first pixel is scanned by reference to the running pixel count, means for determining, for each of the first pixels for which the first pixel condition signal is generated, one of the inspection zones in which the first pixel is scanned by reference to the first scan zone in which the first pixel is scanned, means for determining, for each of the second pixels for which the second condition defect signal is generated, one of the second scan zones in which the second pixel is scanned by reference to the running pixel count, and means for determining, for each of the second pixels for which the second pixel condition signal is generated, one of the inspection zones in which the second pixel is scanned by reference to the second scan zone in which the second pixel is scanned.

In a second embodiment, the present invention provides a system for inspecting an article, wherein the article is divided into a plurality of inspection zones, the system comprising a first pixel detector for scanning a plurality of first pixels in a first region of an article, a second pixel detector for scanning a plurality of second pixels in a second region of the article simultaneously with the scanning of the first pixels in the first region by the first pixel detector, means for generating a running pixel count indicating a number of the first pixels and the second pixels simultaneously scanned by the first pixel detector and the second pixel detector, a pixel condition processing module for generating a first pixel condition signal for each of the first pixels indicating a condition of the article, and for generating a second condition defect signal for each of the second pixels indicating a condition of the article, a microprocessor programmed to divide the article into a plurality of first scan zones, each of the first scan zones containing the first pixels scanned within one of the inspection zones, and divide the article into a plurality of second scan zones, each of the second scan zones containing the second pixels scanned within one of the inspection zones, a first logic circuit defining a plurality of first scan zone width generators and a plurality of second scan zone width generators, wherein each of the first scan zone width generators corresponds to one of the first scan zones and generates a first scan zone width signal when the running pixel count corresponds to one of the first pixels in the first scan zone, and wherein each of the second scan zone width generators corresponds to one of the second scan zones and generates a second scan zone width signal when the running pixel count corresponds to one of the second pixels in the second scan zone, a second logic circuit defining a plurality of first logical AND gates and a plurality of second logical AND gates, wherein each of the first logical AND gates corresponds to one of the first scan zones and generates a first scan zone condition signal when the first scan zone width generator corresponding to the first scan zone generates the first scan zone width signal simultaneously with generation of the first pixel condition signal by the pixel condition processing circuit, and wherein each of the second logical AND gates corresponds to one of the second scan zones and generates a second scan zone condition signal when the second scan zone width generator corresponding to the second scan zone generates the second scan zone width signal simultaneously with generation of the second pixel condition signal by the pixel condition processing circuit, and a third logic circuit defining a plurality of logical OR gates, wherein each of the logical OR gates corresponds to one of the inspection zones and generates an inspection zone condition signal when the first logical AND gate corresponding to the first scan zone containing the first pixels within the inspection zone generates the first scan zone condition signal or when the second logical AND gate corresponding to the second scan zone containing the second pixels within the inspection zone generates the second scan zone condition signal.

In a third embodiment, the present invention provides a method for inspecting an article, the method comprising the steps of scanning a plurality of first pixels in a first region of an article, scanning a plurality of second pixels in a second region of the article simultaneously with the scanning of the first pixels in the first region by the first pixel detector, generating a running pixel count indicating a number of the first pixels and the second pixels simultaneously scanned by the first pixel detector and the second pixel detector, generating a first pixel condition signal for each of the first pixels indicating a condition of the article, and for generating a second pixel condition signal for each of the second pixels indicating a condition of the article, dividing the article into a plurality of inspection zones, dividing the article into a plurality of first scan zones, each of the first scan zones being within one of the inspection zones and representing a subset of the first pixels, dividing the article into a plurality of second scan zones, each of the second scan zones being within one of the inspection zones and representing a subset of the second pixels, determining, for each of the first pixels for which the first pixel condition signal is generated, one of the first scan zones in which the first pixel is scanned by reference to the running pixel count, determining, for each of the first pixels for which the first pixel condition signal is generated, one of the inspection zones in which the first pixel is scanned by reference to the first scan zone in which the first pixel is scanned, determining, for each of the second pixels for which the second condition defect signal is generated, one of the second scan zones in which the second pixel is scanned by reference to the running pixel count, and determining, for each of the second pixels for which the second pixel condition signal is generated, one of the inspection zones in which the second pixel is scanned by reference to the second scan zone in which the second pixel is scanned.

The advantages of the present invention will be set forth in part in the description that follows, and in part will be apparent from the description, or may be learned by practice of the present invention. The advantages of the present invention will be realized and attained by means particularly pointed out in the written description and claims, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION

Figure 4:
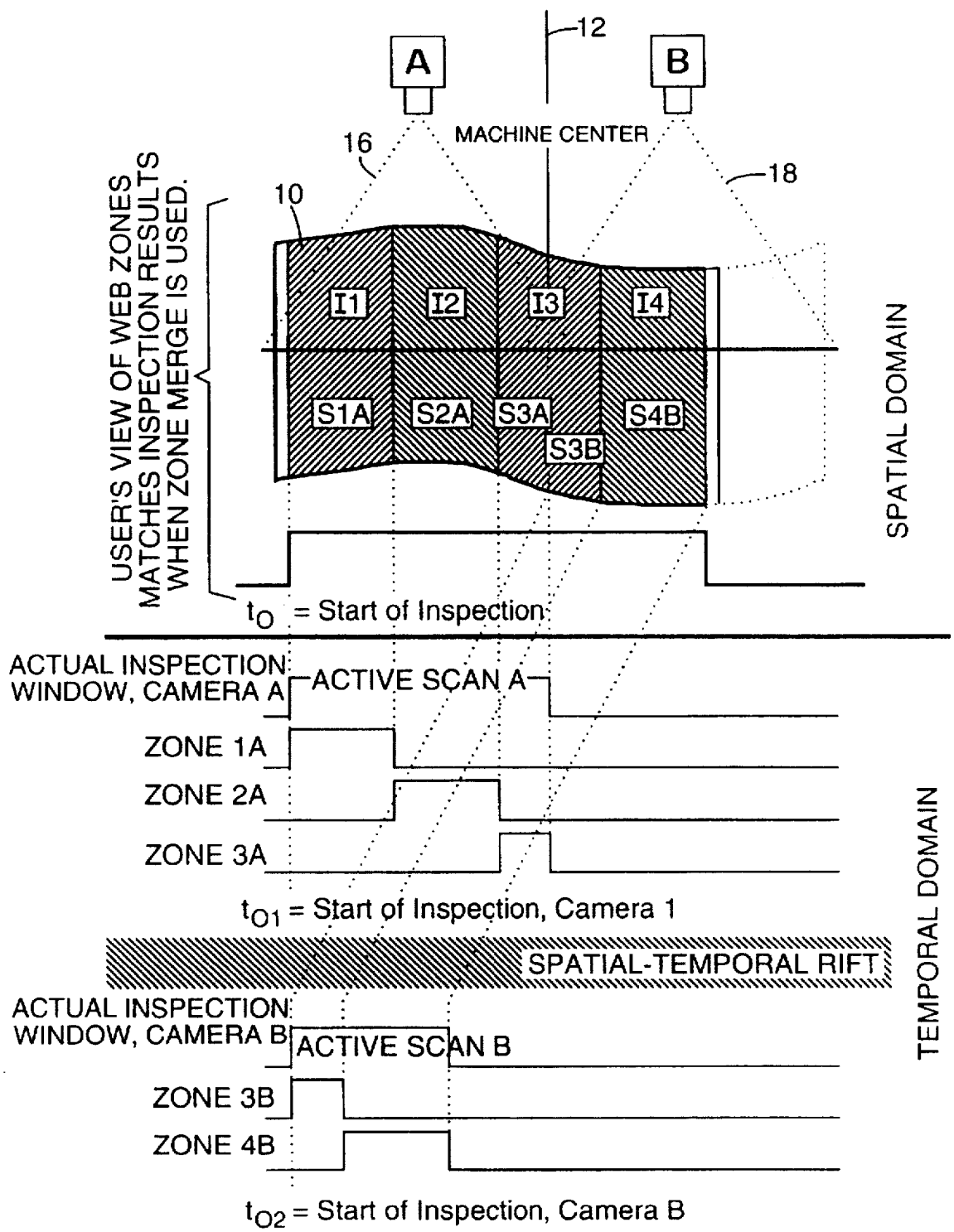
FIG. 4 is a spatial-temporal diagram illustrating the operation of an exemplary embodiment of an article inspection system and method using two pixel detectors, in accordance with the present invention.

FIG. 4 is a spatial-temporal diagram illustrating the operation of an exemplary embodiment of an article inspection system and method using two pixel detectors, in accordance with the present invention. In the example of FIG. 4, each of the pixel detectors comprises a line scan camera. Alternatively, the pixel detector may comprise, for example, a scanned diode array or a scanned photomultiplier tube. Further, in the example of FIG. 4, the article inspection system is applied to a left edge-steered web 10 having four equally sized inspection zones I1, I2, I3, I4. The inspection system includes a first pixel detector in the form of a first line scan camera A and a second pixel detector in the form of a second line scan camera B. The first line scan camera A scans a plurality of first pixels in a first region of web 10. The second line scan camera B scans a plurality of second pixels in a second region of web 10 simultaneously with the scanning of the first pixels in the first region by first line scan camera A. The first region and second region are defined by the active scans of first and second line scan cameras A and B, respectively. An example of a suitable line scan camera for use in the inspection system of the present invention is the LC1902 or LC1912 line scan camera commercially available from Reticon of Sunnyvale, Calif.

Figure 1:
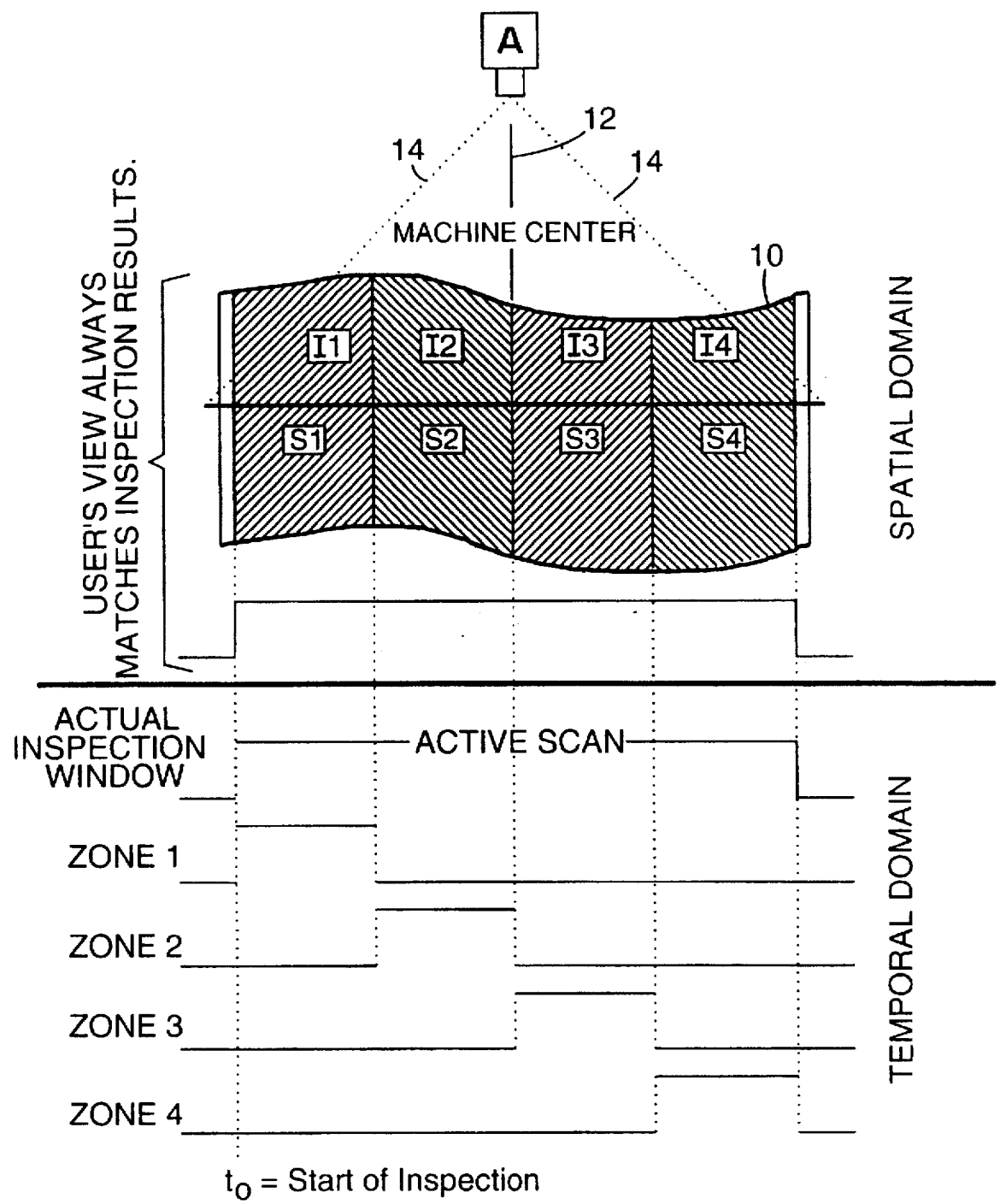
FIG. 1 is a spatial-temporal diagram illustrating an example of an article inspection system using a single pixel detector.
Figure 2:
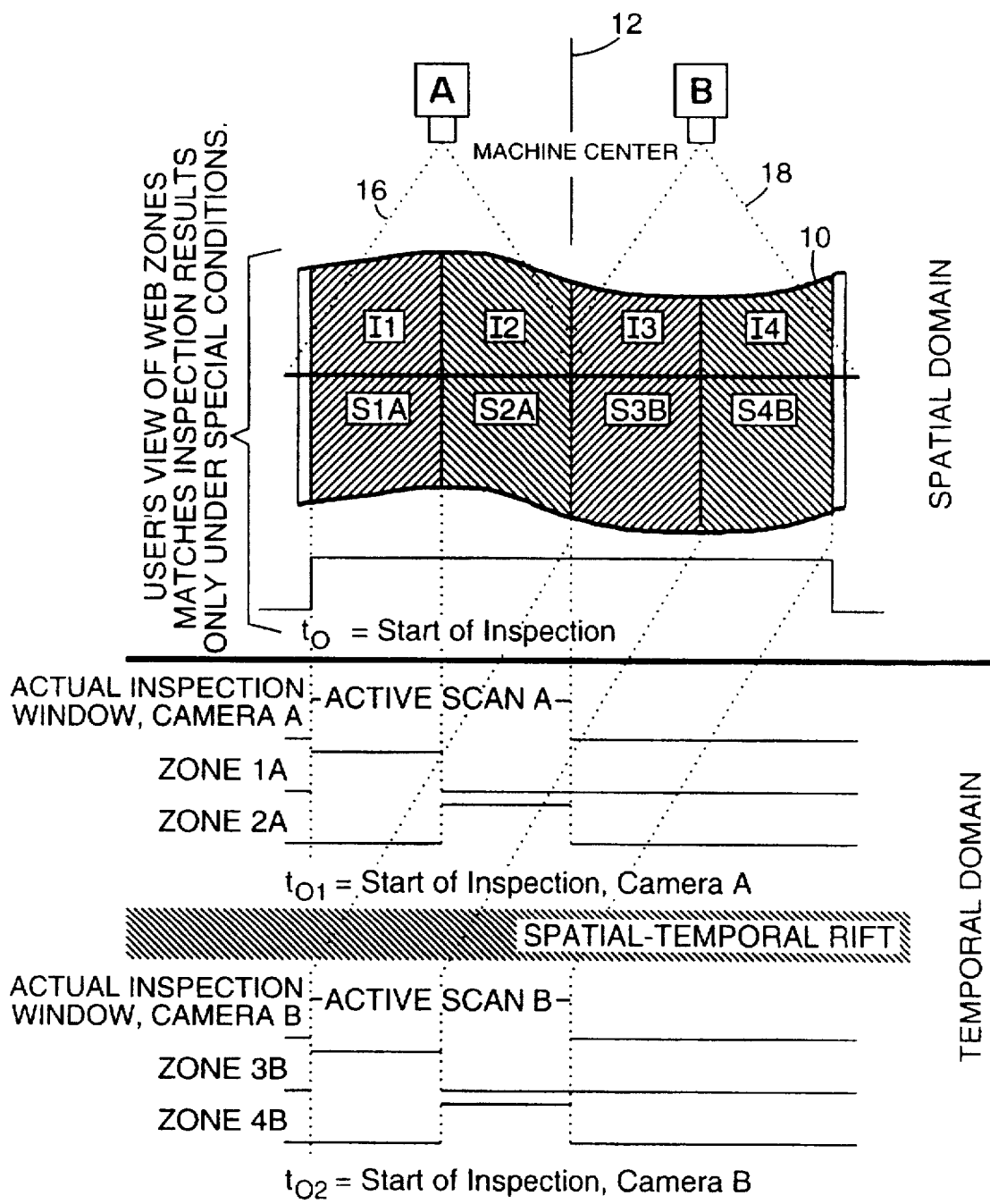
FIG. 2 is a spatial-temporal diagram illustrating an example of an article inspection system using two pixel detectors oriented to scan equally-sized regions of an article.
Figure 3:
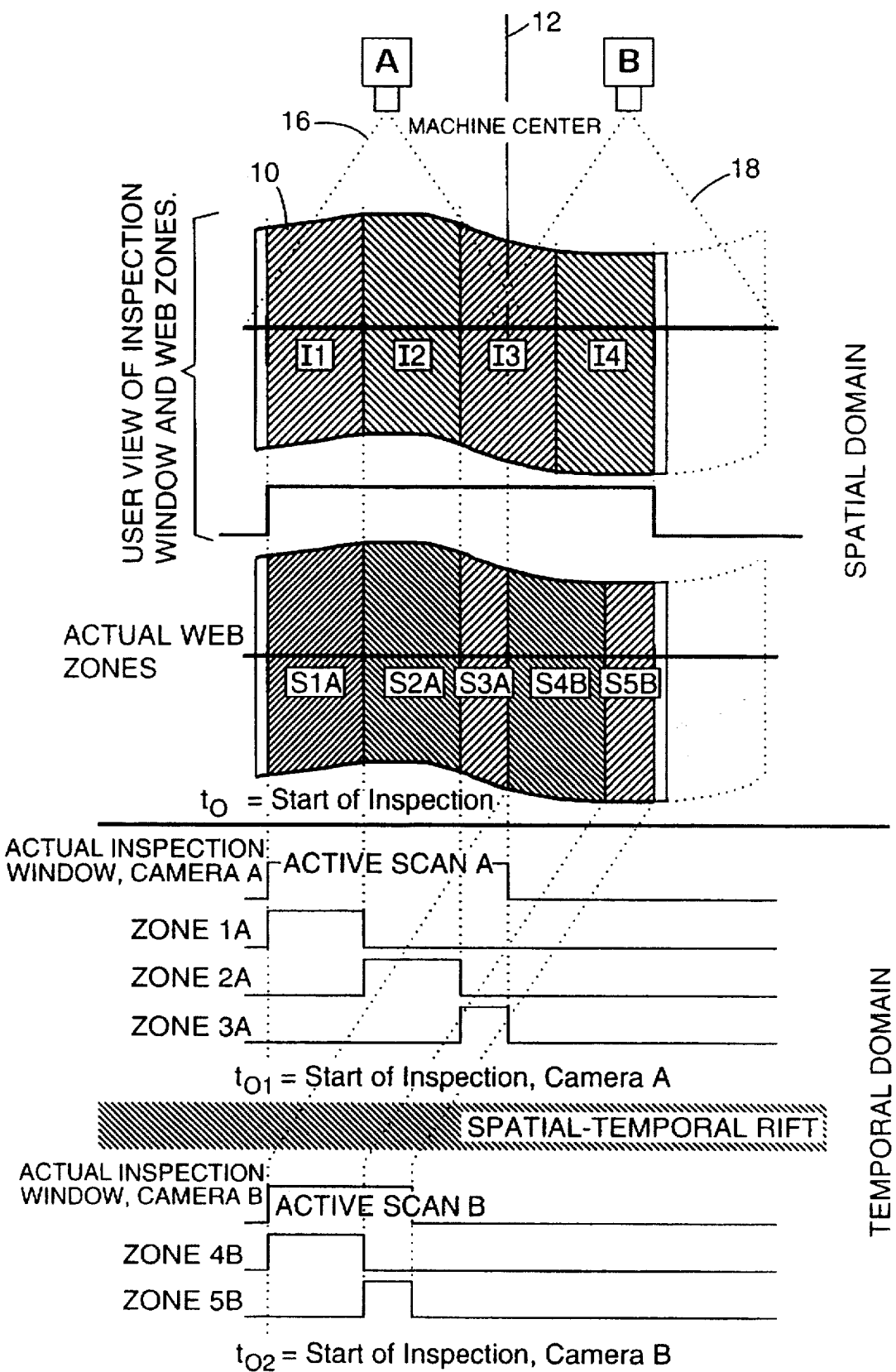
FIG. 3 is a spatial-temporal diagram illustrating an example of an article inspection system using two pixel detectors oriented to scan differently-sized regions of an article positioned off-center relative to the scan boundary of the cameras.

FIG. 4 shows both a spatial domain representing the spatial coverage of fields of view 16, 18 of line scan cameras A, B relative to web 10, and a temporal domain representing the progression of the active scans of the cameras across different web zones over time. As in the example of FIG. 3, web 10 in FIG. 4 is left edge-steered and has a width less than the maximum width accommodated by the web line. As a result, the center of web 10 does not coincide with machine center 12. For inspection, the user views inspection zones I1, I2, I3, and I4 on web 10 without regard to the position of machine center 12 or the active scans of cameras A and B. As shown in FIG. 4, the active scans of cameras A, B cover inspection zones I1, I2, I3, and I4 with scan zones S1A, S2A, S3A, S3B, S4B.

FIG. 4 indicates that scan zones S1A and S2A correspond both temporally and spatially to inspection zones I1 and I2, respectively. Although the active scan of camera A truncates inspection zone I3, producing scan zone S3A, the inspection system of the present invention recognizes scan zone S3A as a partial zone, as will be explained. At the beginning of the active scan of camera B, scan zone S3B extends to the end of inspection zone I3. As will be described, the inspection system of the present invention also recognizes that scan zone S3B is a partial zone. The inspection system merges defects detected in partial scan zones S3A and S3B in real time to cover inspection zone I3, even though partial scan zone S3B actually occurs in time prior to scan zone S3A, as indicated by the temporal domain in FIG. 4. As further shown in FIG. 4, the active scan of camera B also produces a scan zone S4B that extends to the end of web 10 and covers inspection zone I4.

The inspection system of the present invention transforms the parallel, temporal operation of scan line cameras A and B to a serial, spatial domain in real time so that a user can view the inspection results with reference to inspection zones I1, I2, I3, and I4. With reference to the example of FIG. 4, the transformation involves merging the defects detected in partial scan zones S3A and S3B by line scan cameras A and B to form a representation of the results in inspection zone I3. The boundary between partial scan zones S3A and S3B in FIG. 4 is referred to as the merge boundary. In practice, the merge boundary can occur in any of the inspection zones, depending on variations in web width, web steering, or the number of inspection zones selected by the user. In addition, as will be apparent from this description, the user need not select an even number of inspection zones or a particular steering option.

Figure 5:
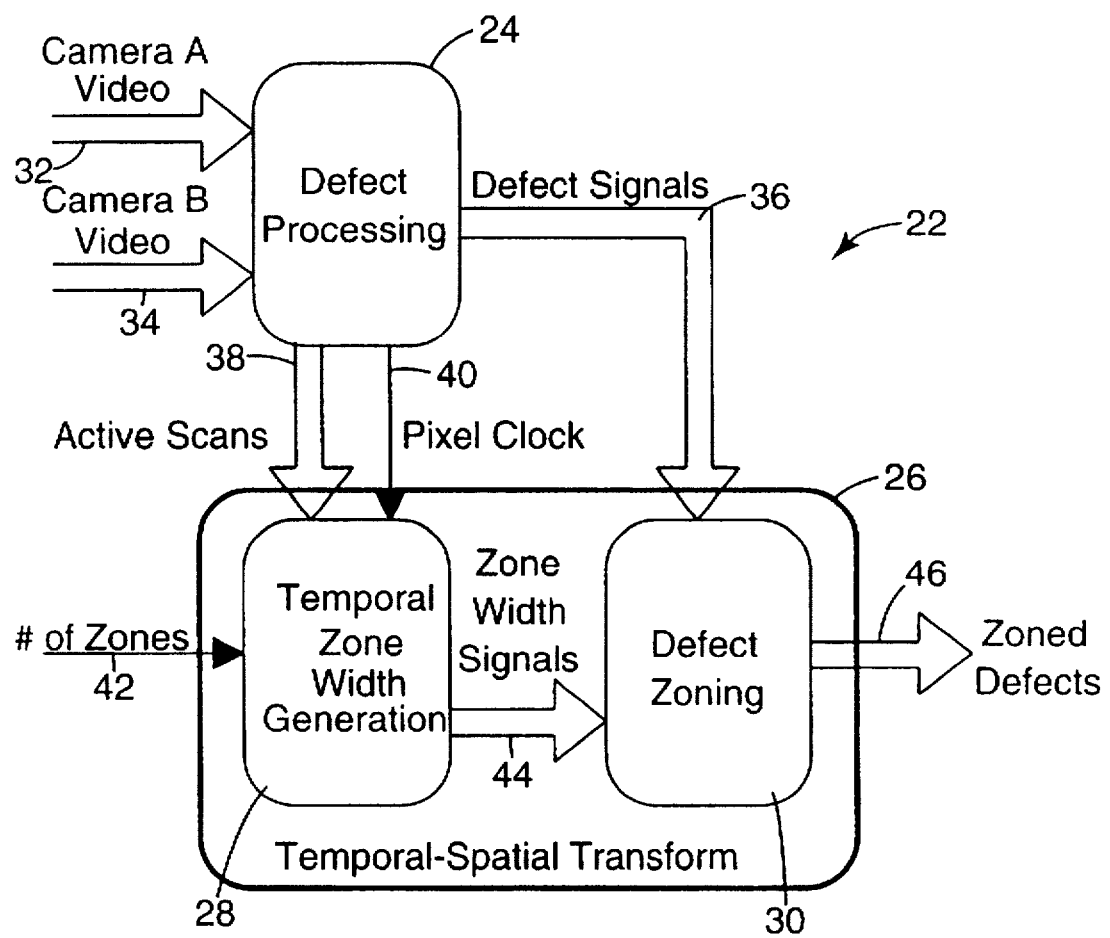
FIG. 5 is functional block diagram of an example of a pixel data processing system for an article inspection system, in accordance with the present invention.

FIG. 5 is a functional block diagram of a pixel data processing system 22 for an article inspection system, in accordance with the present invention. As shown in FIG. 5, pixel data processing system 22 may include a defect processing module 24 and a temporal-spatial transform module 26. The temporal-spatial transform module 26 may include a temporal scan zone width generation submodule 28, and a defect zoning submodule 30. The defect processing module 24 can be realized, for example, by electronic hardware configured to receive the video scan pixel signals from cameras A, B, and to identify those signals that represent defects in the article being inspected. The temporal scan zone width generation submodule 28 may comprise, for example, the combination of a microprocessor, counters loaded by the microprocessor, and a logic circuit. The defect zoning submodule 30 may comprise a logic circuit. Although reference is made to detection of defects, the present invention may be readily applied to inspection systems for detecting other article conditions of interest.

The defect processing module 24 processes pixel signals generated by line scan camera A, as indicated by input 32, and pixel signals generated by line scan camera B, as indicated by input 34. The defect processing module 24 extracts pixel defect signals from the pixel signals received from cameras A and B. In other words, if the pixel signal indicates a defect on web 10, defect processing module 24 generates a pixel defect signal, as indicated by output 36. The defect processing module 24 may determine if a pixel signal indicates a defect by, for example, measuring an amplitude of the pixel signal. The amplitude of the pixel signal may be a function of an optical density of the article at a position corresponding to the particular pixel scanned by camera A or B. Thus, the defect processing module 24 may include a comparator circuit that compares the amplitude of the pixel signal to a defect threshold representing an amplitude indicative of a defect. The pixel defect signals generated by defect processing module 24 are temporal events that are transformed into a spatial domain, in accordance with the present invention.

In addition to generating pixel defect signals, defect processing module 24 generates active scan signals for both camera A and camera B, as indicated by output 38, and a pixel clock signal, as indicated by output 40. The active scan signal for camera A is at a first logic level when camera A is in the process of scanning web 10. Similarly, the active scan signal for camera B is at the first logic level when camera B is in the process of scanning web 10. The active scan signal for each camera A or B is at a second logic level when the camera is not in the process of scanning web 10. Cameras A and B are operated in parallel to simultaneously scan first and second regions of web 10, and share a common pixel clocking frequency that controls the rate of transition between consecutive pixels in the scan line. The pixel clock signal generated by defect processing module 24 is synchronized to the pixel clocking frequency of cameras A and B. The active scan signals and the pixel clock signal enable pixel defect signals to be associated with particular pixels scanned by cameras A and B, as will be explained.

With further reference to FIG. 5, temporal scan zone width generation submodule 28 receives the active scan signals and the pixel clock signal from defect processing module 24, and also receives a signal indicating the number of inspection zones desired by a user, as indicated by input 42. The temporal zone width generation module 28 generates scan zone width signals, as indicated by output 44. Each of the scan zone width signals indicates that one of the cameras A or B is actively scanning in a particular scan zone S1A, S2A, S3A, S3B, S4B. The defect zoning module 30 receives pixel defect signals from defect processing module 24, as indicated by line 36. The defect zoning module 30, in effect, combines the pixel defect signals with the scan zone width signals received from temporal scan zone width generation module 28 to create zoned defect signals, as indicated by output 46. The zoned defect signals associate each pixel defect signal obtained from a particular scan zone S1A, S2A, S3A, S3B, S4B with the appropriate inspection zone I1, I2, I3, I4. In this manner, defect zoning module 30 transforms the temporal pixel defect signals to a spatial domain, facilitating zoned defect analysis by a human user.

Figure 6:
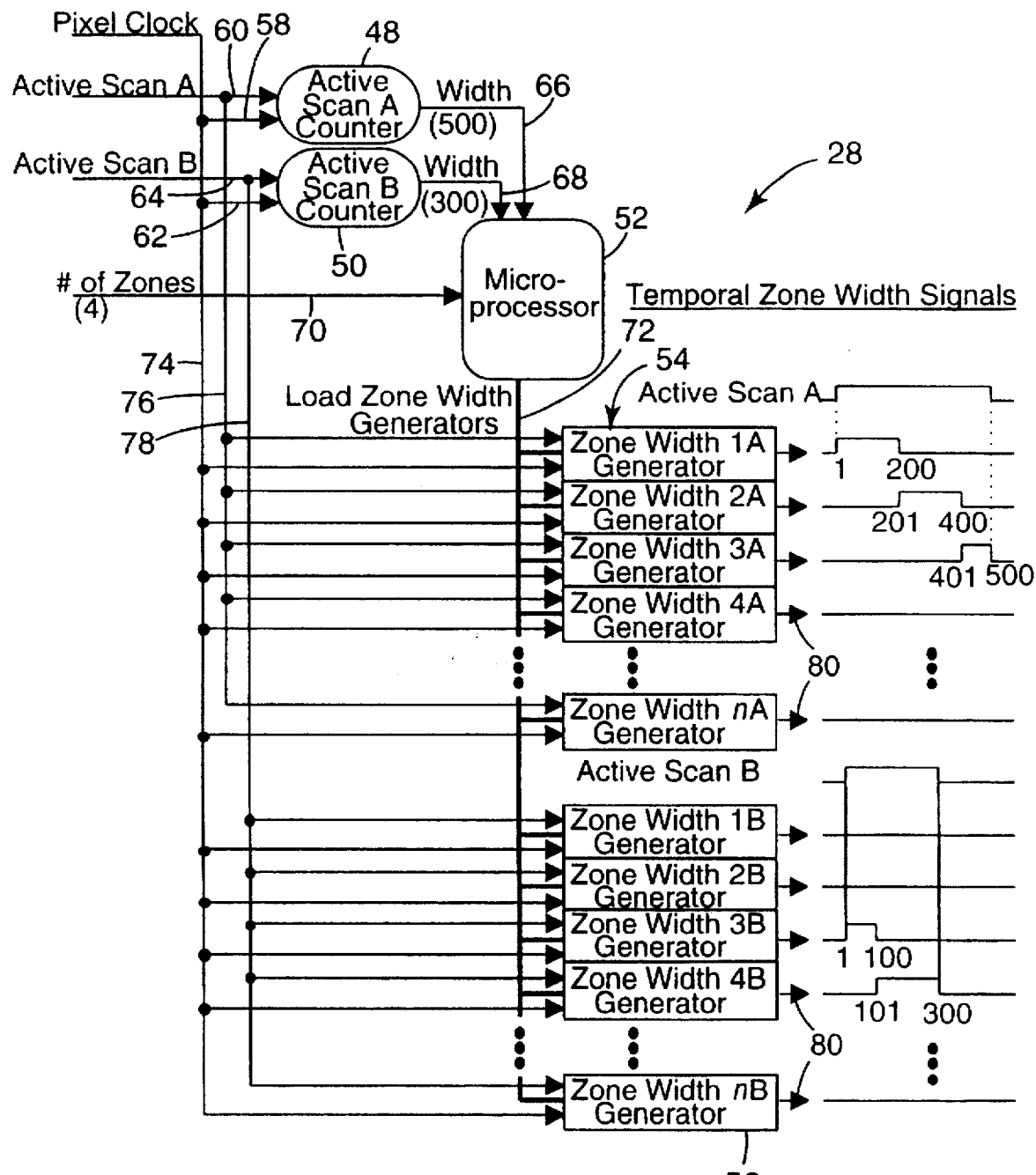
FIG. 6 is a functional block diagram of an example of a temporal zone width generating module forming part of the pixel data processing system shown in FIG. 5.

FIG. 6 is a functional block diagram of an example of temporal zone width generation submodule 28 forming part of pixel data processing system 22 shown in FIG. 5. As shown in FIG. 6, temporal zone width generation module 28 may include an active scan A counter 48, an active scan B counter 50, a microprocessor 52, a plurality of scan zone width A generators 54, and a plurality of scan zone width B generators 56. The active scan counters 48, 50 count the number of pixel clock cycles in each of the active scans of cameras A and B to determine the number of pixels scanned by each camera. Active scan A counter 48 receives from defect processing module 24 the pixel clock signal, as indicated by input 58, and the active scan signal for camera A, as indicated by input 60. Active scan B counter 50 receives from defect processing module 24 the pixel clock signal, as indicated by input 62, and the active scan signal for camera B, as indicated by input 64. Active scan A counter 48 counts the number of pixel cycles clocked while the active scan signal for camera A is at the first logic level, whereas active scan B counter 50 counts the number of pixel cycles clocked while the active scan signal for camera B is at the first logic level. For purposes of this example, it will be assumed that camera A has been calibrated to have an active scan of 500 pixels and camera B has been calibrated to have an active scan of 300 pixels. The active scan counters 48, 50 output the number of pixels in each active scan as active scan width signals, as indicated by outputs 66, 68, respectively.

The microprocessor 52 receives the scan width signals from active scan counters 48, 50, and also receives a signal indicating the number of inspection zones selected by a user, as indicated by input 70. For purposes of this example, it will be assumed that the user has selected four equally-sized inspection zones I1, I2, I3, I4, as shown in FIG. 4. The microprocessor 52 adds the active scan widths together, with reference to the active scan width signals received from active scan counters 48, 50, to produce a measurement of the number of pixels scanned by cameras A and B across the entire inspection window on web 10. In this example, the total number of pixels in the inspection window yields an inspection width of 500+300=800. The microprocessor 52 divides this total inspection width by the number of inspection zones selected by the user to calculate the number of pixels per inspection zone I1, I2, I3, I4.

With knowledge of the number of pixels per inspection zone and the number of pixels within the active scans of each of cameras A and B, microprocessor 52 can determine the complete and partial scan zones provided by the cameras. With an inspection width of 800 pixels, each of four inspection zones I1, I2, I3, I4 will have 200 pixels. Thus, the active scan of camera A will yield two complete scan zones S1A, S2A, of 200 pixels each, corresponding to inspection zones I1 and I2, and a partial scan zone S3A, of 100 pixels, that corresponds to a portion of inspection zone I3. The pixels in scan zones S1A, S2A, S3A (200+200+100) fill the entire active scan (500) of camera A. The active scan of camera B then will yield a partial scan zone S3B, of 100 pixels, corresponding to the remaining portion of inspection zone I3, and a complete scan zone S4B, of 200 pixels, corresponding to inspection zone I4. The pixels in scan zones S3B, S4B (100+200) fill the entire active scan (300) of camera B. An illustration of the coverage provided by scan zones S1A, S2A, S3A, S3B, and S4B can be seen in the example of FIG. 4.

After determining the widths of all complete and partial scan zones S1A, S2A, S3A, S3B, S4B, microprocessor 52 configures scan zone width generators 54, 56. Each of scan zone width generators 54, 56 may include, for example, a counter and logic circuitry. The microprocessor 52 configures each scan zone width generator 54, 56 by loading the associated counter with appropriate start and stop values, as indicated by output 72. The start and stop values are determined based on the width of the particular scan zone to which the scan zone width generator 54, 56 corresponds. In this example, microprocessor 52 loads the counters of scan zone width generators 54, 56 with appropriate start and stop values to generate scan zone width signals 1A through nA and 1B through nB. In this example, n equals four, the number of inspection zones I1, I2, I3, I4.

Each of scan zone width A generators 54 is responsive to the pixel clock signal, as indicated by input 74, and the active scan A signal, as indicated by input 76. Each of scan zone width B generators 56 is responsive to the pixel clock signal, as indicated by input 74, and the active scan B signal, as indicated by input 78. The counter associated with each scan zone width generator 54, 56 begins counting in response to the active scan signal for the appropriate counter, and counts in synchronization with the pixel clock signal. The counter generates an active scan zone signal when the start value is reached, and continues generating the active scan zone signal until the stop value is reached. Thus, the counter generates the active scan zone signal when the pixel count and the respective active scan signal indicate that the scan of camera A or B coincides with the appropriate scan zone. In response to the active scan zone signal, the logic circuitry associated with each of scan zone width generators 54, 56 generates a temporal zone width signal at a first logic level, as indicated by outputs 80.

As shown in FIG. 6, in this example, the logic circuitry associated with scan zone width generators 54 for scan zones S1A, S2A, and S3A generates temporal zone width signals at the first logic level when both the active scan signal for camera A is at the first logic level and the running pixel count indicates that the simultaneous camera A scan is in the ranges of 1–200, 201–400, and 401–500, respectively. Similarly, the logic circuitry associated with scan zone width generators 56 for scan zones S3B and S4B generates temporal zone width signals at the first logic level when both the active scan signal for camera B is at the first logic level and the running pixel count indicates that the simultaneous camera B scan is in the ranges of 1–100 and 101–300, respectively. In this example, scan zone width A generator 54 for scan zone S4A remains idle because scan zone S4A does not exist within the active scan of camera A. Similarly, scan zone width generators 56 for scan zones S1B and S2B remain idle because scan zones S1B and S2B do not exist within the active scan of camera B.

Figure 7:
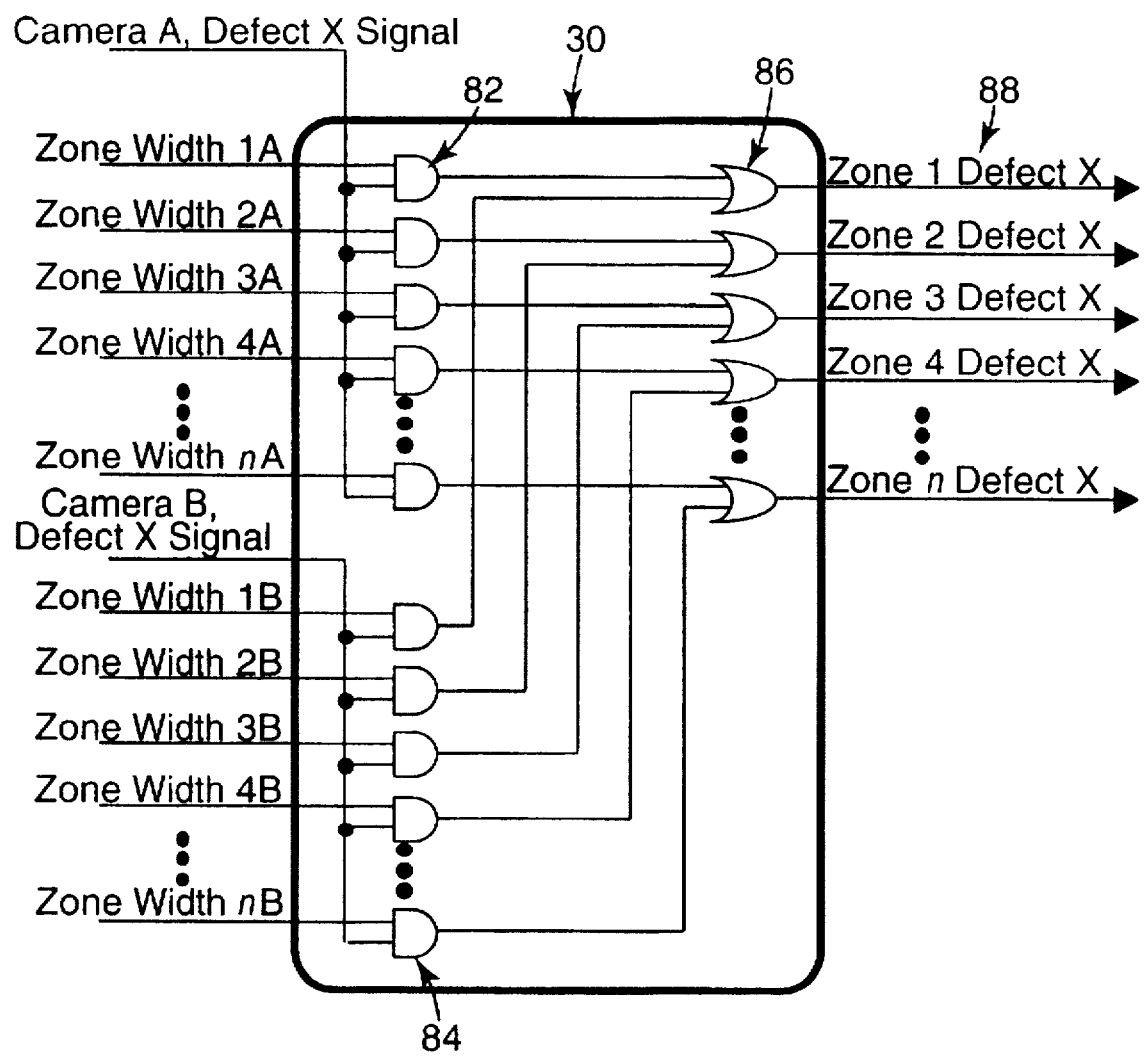
FIG. 7 is logic circuit diagram of an example of a zoning module forming part of the pixel data processing system shown in FIG. 5.

FIG. 7 is a logic circuit diagram of an example of a defect zoning submodule 30 forming part of pixel data processing system 22 shown in FIG. 5. As shown in FIG. 7, defect zoning submodule 30 comprises logic circuitry configured to have a plurality of first logical AND gates 82, a plurality of second logical AND gates 84, and a plurality of logical OR gates 86. Each of first logical AND gates 82 is coupled to the output of one of first scan zone width A generators 54, and thus corresponds to one of first scan zones S1A, S2A, S3A, S4A. In the present example, however, only scan zones S1A, S2A, and S3A are active. In addition, each of first logical AND gates 82 is coupled to the output of defect processing module 24 and receives pixel defect signals for camera A. Similarly, each of second logical AND gates 84 is coupled to the output of one of second scan zone width generators 56, and thus corresponds to one of second scan zones S1B, S2B, S3B, S4B. In the present example, only scan zones S3B and S4B are active. Each of second logical AND gates 84 also is coupled to the output of defect processing module 24 and receives pixel defect signals for camera B.

Each of first logical AND gates 82 generates a first scan zone defect signal at a first logic level when the first scan zone width generator 54 corresponding to the appropriate first scan zone S1A, S2A, S3A, S4A generates a first scan zone width signal at a first logic level simultaneously with generation of a pixel defect signal for camera A by defect processing module 24. In other words, when the first scan zone width generator 54 coupled to the particular first AND gate 82 generates a first scan zone width signal at the first logic level and defect processing module 24 generates a pixel defect signal for camera A, the output of the first AND gate goes to the first logic level. In an identical manner, each of second logical AND gates 84 generates a second scan zone defect signal at the first logic level when the second scan zone width generator 56 corresponding to the appropriate second scan zone S1B, S2B, S3B, S4B generates a first scan zone width signal at the first logic level simultaneously with generation of a pixel defect signal for camera B by defect processing module 24. Thus, when the second scan zone width generator 56 coupled to the particular second AND gate 84 generates a second scan zone width signal at the first logic level and defect processing module 24 generates a pixel defect signal for camera B, the output of the second AND gate goes to the first logic level.

Each of logical OR gates 86 corresponds to one of inspection zones I1, I2, I3, I4. Each of logical OR gates 86 is coupled to the outputs of the particular AND gates that correspond to scan zones S1A, S2A, S3A, S4A, S1B, S2B, S3B, S4B that theoretically would fall within the appropriate inspection zone. For example, the OR gate corresponding to inspection zone I1 receives output from the AND gates for scan zones S1A and S1B. In the present example, scan zone S1A completes the entire inspection zone I1, whereas scan zone S1B does not exist. The defect zoning module 30 merges defects detected in partial scan zones within the same inspection zone. In particular, in the present example, the OR gate corresponding to inspection zone I3 receives output from the AND gates for scan zones S3A and S3B. Scan zones S3A and S3B are partial scan zones that together cover inspection zone I3. Thus, the OR gate for inspection zone I3 receives indication of a defect in either scan zone S3A or scan zone S3B and logs the defect as being in inspection zone I3. In this manner, defect zoning module 30, in effect, merges defects from scan zones S1A–S4A and S1B–S4B viewed by cameras A and B to facilitate defect analysis by a user with reference to inspection zones I1, I2, I3, I4.

Each of OR gates 86 generates an inspection zone defect signal, as indicated by outputs 88, for the appropriate inspection zone when either the logical AND gate 82 corresponding to the first scan zone containing the first pixels within the inspection zone generates the first scan zone defect signal or when the second logical AND gate 84 corresponding to the second scan zone containing the second pixels within the inspection zone generates the second scan zone defect signal. In other words, each of OR gates 86 generates the inspection zone defect signal when either the output of the AND gate 82 for the appropriate camera A scan zone goes to the first logic level, or the AND gate 84 for the appropriate camera B scan zone goes to the first logic level. The logic in defect zoning module 30 completes the transformation of the temporally separate defects detected by cameras A and B into a spatially continuous result. In other words, the defects that appear within the various temporally scanned zones S1A–S4A and S1B–S4B are recombined to form zoned defects organized by spatial web inspection zones I1–I4. The inspection zone defect signals generated by OR gates 86 can be routed to displays, accumulated for each inspection zone by defect counters, or routed to other storage devices. The inspection zone defect signals can be readily subjected to additional processing such as, for example, additional classification of defect types or additional classification of down-web spatial position.

Having described the exemplary embodiments of the invention, additional advantages and modifications will readily occur to those skilled in the art from consideration of the specification and practice of the invention disclosed herein. For example, the inspection system and method of the present invention can be readily applied to inspection applications employing three or more line scan cameras and varying numbers of inspection zones. Therefore, the specification and examples should be considered exemplary only, with the true scope and spirit of the invention being indicated by the following claims.

What is claimed is:

1. A system for inspecting an article, wherein the article is divided into a plurality of inspection zones, the system comprising:

a first pixel detector for scanning a plurality of first pixels in a first region of an article;

a second pixel detector for scanning a plurality of second pixels in a second region of the article simultaneously with the scanning of the first pixels in the first region by the first pixel detector;

means for generating a running pixel count indicating a number of the first pixels and the second pixels simultaneously scanned by the first pixel detector and the second pixel detector;

means for generating a first pixel condition signal for each of the first pixels indicating a condition of the article, and for generating a second pixel condition signal for each of the second pixels indicating a condition of the article;

means for dividing the article into a plurality of first scan zones, each of the first scan zones being within one of the inspection zones and representing a subset of the first pixels;

means for dividing the article into a plurality of second scan zones, each of the second scan zones being within one of the inspection zones and representing a subset of the second pixels;

means for determining, for each of the first pixels for which the first pixel condition signal is generated, one of the first scan zones in which the first pixel is scanned by reference to the running pixel count;

means for determining, for each of the first pixels for which the first pixel condition signal is generated, one of the inspection zones in which the first pixel is scanned by reference to the first scan zone in which the first pixel is scanned;

means for determining, for each of the second pixels for which the second condition defect signal is generated, one of the second scan zones in which the second pixel is scanned by reference to the running pixel count; and means for determining, for each of the second pixels for which the second pixel condition signal is generated, one of the inspection zones in which the second pixel is scanned by reference to the second scan zone in which the second pixel is scanned.

2. The system of claim 1, wherein the article is a web.

3. The system of claim 1, wherein the condition is a defect in the article.

4. The system of claim 1, wherein the first pixels in at least one of the first scan zones and the second pixels in at least one of the second scan zones are scanned in a common one of the inspection zones.

5. The system of claim 1, wherein each of the inspection zones has a width equivalent to a width of each of the other inspection zones, wherein at least one of the first scan zones has a width non-equivalent to a width of each of the other first scan zones, and wherein at least one of the second scan zones has a width non-equivalent to a width of each of the other second scan zones.

6. The system of claim 1, wherein each of the first pixel detector and the second pixel detector is a line scan camera.

7. A system for inspecting an article, wherein the article is divided into a plurality of inspection zones, the system comprising:

a first pixel detector for scanning a plurality of first pixels in a first region of an article;

a second pixel detector for scanning a plurality of second pixels in a second region of the article simultaneously with the scanning of the first pixels in the first region by the first pixel detector;

means for generating a running pixel count indicating a number of the first pixels and the second pixels simultaneously scanned by the first pixel detector and the second pixel detector;

a pixel condition processing module for generating a first pixel condition signal for each of the first pixels indicating a condition of the article, and for generating a second condition defect signal for each of the second pixels indicating a condition of the article;

a microprocessor programmed to divide the article into a plurality of first scan zones, each of the first scan zones containing the first pixels scanned within one of the inspection zones, and divide the article into a plurality of second scan zones, each of the second scan zones containing the second pixels scanned within one of the inspection zones;

a first logic circuit defining a plurality of first scan zone width generators and a plurality of second scan zone width generators, wherein each of the first scan zone width generators corresponds to one of the first scan zones and generates a first scan zone width signal when the running pixel count corresponds to one of the first pixels in the first scan zone, and wherein each of the second scan zone width generators corresponds to one of the second scan zones and generates a second scan zone width signal when the running pixel count corresponds to one of the second pixels in the second scan zone;

a second logic circuit defining a plurality of first logical AND gates and a plurality of second logical AND gates, wherein each of the first logical AND gates corresponds to one of the first scan zones and generates a first scan zone condition signal when the first scan zone width generator corresponding to the first scan zone generates the first scan zone width signal simultaneously with generation of the first pixel condition signal by the pixel condition processing circuit, and wherein each of the second logical AND gates corresponds to one of the second scan zones and generates a second scan zone condition signal when the second scan zone width generator corresponding to the second scan zone generates the second scan zone width signal simultaneously with generation of the second pixel condition signal by the pixel condition processing circuit; and a third logic circuit defining a plurality of logical OR gates, wherein each of the logical OR gates corresponds to one of the inspection zones and generates an inspection zone condition signal when the first logical AND gate corresponding to the first scan zone containing the first pixels within the inspection zone generates the first scan zone condition signal or when the second logical AND gate corresponding to the second scan zone containing the second pixels within the inspection zone generates the second scan zone condition signal.

8. The system of claim 7, wherein the article is a web.

9. The system of claim 7, wherein the condition is a defect in the article.

10. The system of claim 7, wherein the first pixels in at least one of the first scan zones and the second pixels in at least one of the second scan zones are scanned in a common one of the inspection zones.

11. The system of claim 7, wherein each of the inspection zones has a width equivalent to a width of each of the other inspection zones, wherein at least one of the first scan zones has a width non-equivalent to a width of each of the other first scan zones, and wherein at least one of the second scan zones has a width non-equivalent to a width of each of the other second scan zones.

12. The system of claim 7, wherein each of the first pixel detector and the second pixel detector is a line scan camera.

13. A method for inspecting an article, wherein the article is divided into a plurality of inspection zones, the method comprising the steps of:

scanning a plurality of first pixels in a first region of an article;

scanning a plurality of second pixels in a second region of the article simultaneously with the scanning of the first pixels in the first region by the first pixel detector;

generating a running pixel count indicating a number of the first pixels and the second pixels simultaneously scanned by the first pixel detector and the second pixel detector;

generating a first pixel condition signal for each of the first pixels indicating a condition of the article, and for generating a second pixel condition signal for each of the second pixels indicating a condition of the article;

dividing the article into a plurality of first scan zones, each of the first scan zones being within one of the inspection zones and representing a subset of the first pixels;

dividing the article into a plurality of second scan zones, each of the second scan zones being within one of the inspection zones and representing a subset of the second pixels;

determining, for each of the first pixels for which the first pixel condition signal is generated, one of the first scan zones in which the first pixel is scanned by reference to the running pixel count;

determining, for each of the first pixels for which the first pixel condition signal is generated, one of the inspection zones in which the first pixel is scanned by reference to the first scan zone in which the first pixel is scanned;

determining, for each of the second pixels for which the second condition defect signal is generated, one of the second scan zones in which the second pixel is scanned by reference to the running pixel count; and determining, for each of the second pixels for which the second pixel condition signal is generated, one of the inspection zones in which the second pixel is scanned by reference to the second scan zone in which the second pixel is scanned.

14. The method of claim 13, wherein the article is a web.

15. The method of claim 13, wherein the condition is a defect in the article.

16. The method of claim 13, wherein the first pixels in at least one of the first scan zones and the second pixels in at least one of the second scan zones are scanned in a common one of the inspection zones.

17. The method of claim 13, wherein each of the inspection zones has a width equivalent to a width of each of the other inspection zones, wherein at least one of the first scan zones has a width non-equivalent to a width of each of the other first scan zones, and wherein at least one of the second scan zones has a width non-equivalent to a width of each of the other second scan zones.

18. The method of claim 13, wherein each of the first pixel detector and the second pixel detector is a line scan camera.

* * * * *